C. H. AYARS.
FEEDING MECHANISM FOR CAN FILLING MACHINES.
APPLICATION FILED JAN. 30, 1914.
1,190,234.
Patented July 4, 1916.
2 SHEETS—SHEET 1.
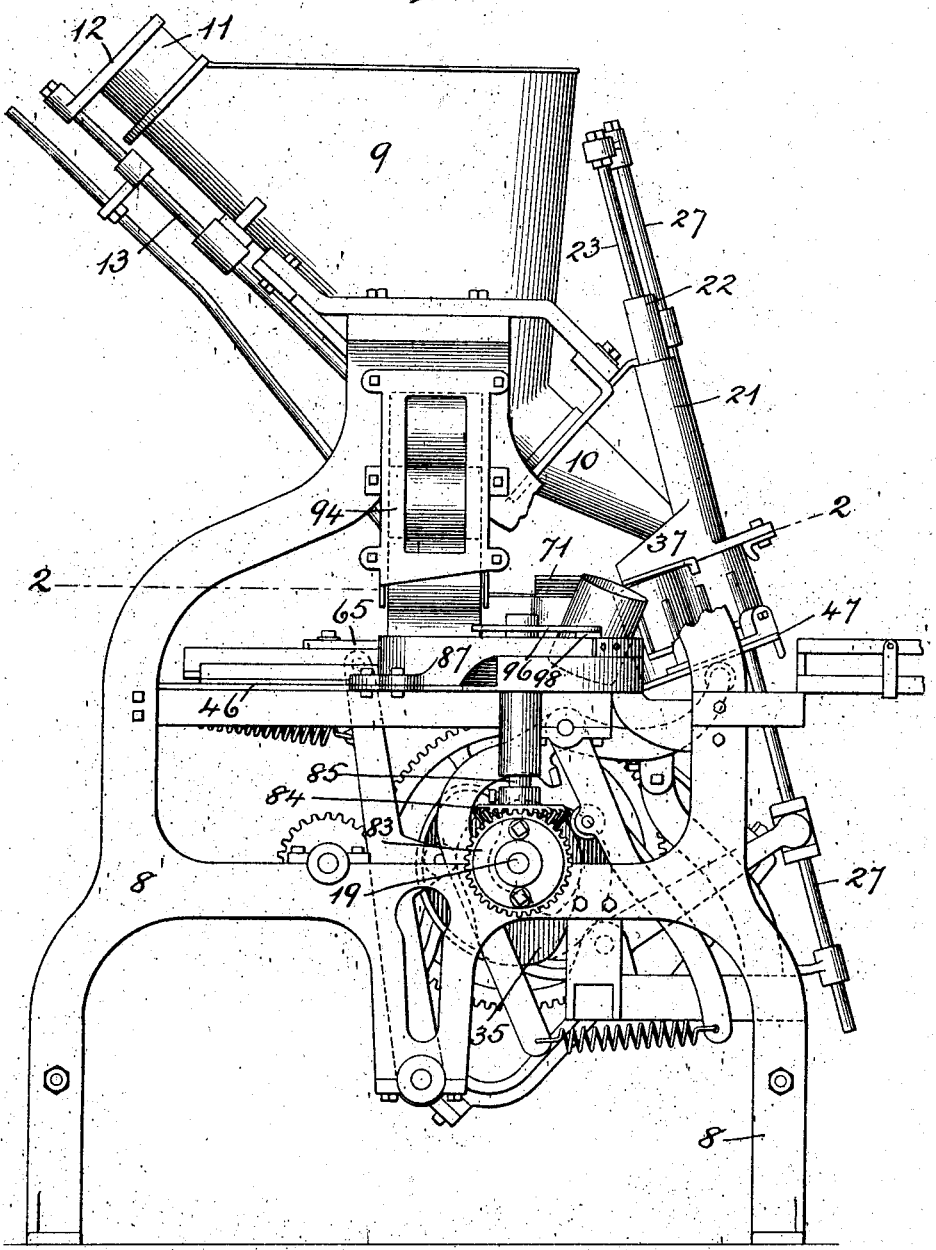

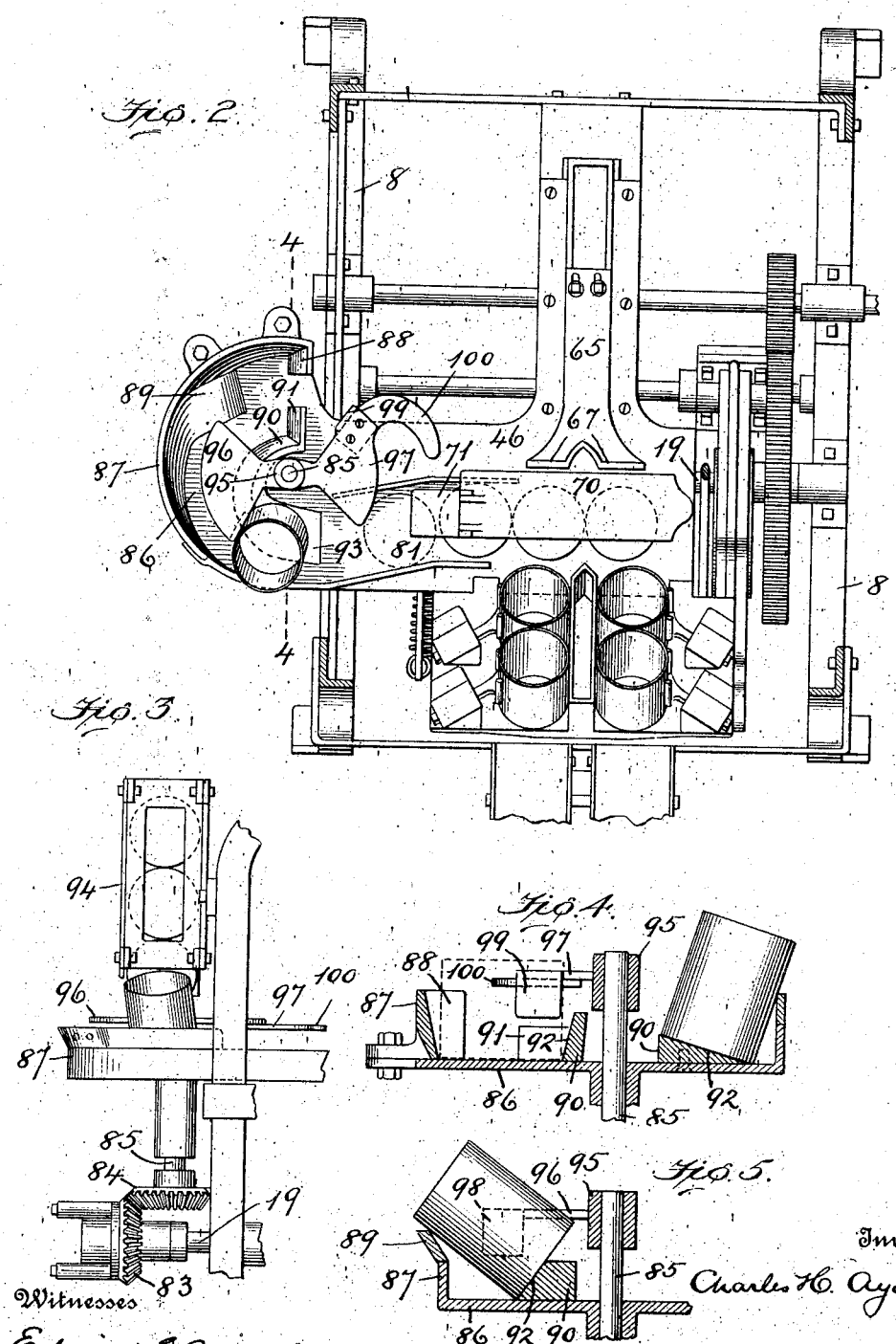

UNITED STATES PATENT OFFICE.

CHARLES H. AYARS, OF SALEM, NEW JERSEY, ASSIGNOR TO AYARS MACHINE COMPANY, OF SALEM, NEW JERSEY, A CORPORATION OF NEW JERSEY.

FEEDING MECHANISM FOR CAN-FILLING MACHINES.

1,190,234.     Specification of Letters Patent.     Patented July 4, 1916.

Application filed January 30, 1914. Serial No. 815,394.

*To all whom it may concern:*

Be it known that I, CHARLES H. AYARS, a citizen of the United States, residing at Salem, in the county of Salem and State of New Jersey, have invented certain new and useful Improvements in Feeding Mechanism for Can-Filling Machines, of which the following is a specification.

This invention relates to can filling machines and has particular reference to the mechanism for feeding the cans.

At the present time, in the art of packing canned goods, there is a more or less tendency to use what is termed in the trade as sanitary cans, which latter at the time of filling, are entirely open and free of a head at one end. These open-end cans are troublesome to handle and to convey to the filling machines because if they are fed from overhead end-on-end through a chute they will telescope and cause considerable annoyance.

The present invention therefore has for one object to provide an improved can feed for can filling machines wherein entirely open or partly open-end cans may be fed through a chute from overhead in such a way as to prevent telescoping.

Another object of the invention is to provide improved means for receiving empty cans on their sides and then righting them to turn their open or partially open ends uppermost and present them to a can-filling mechanism.

In illustrating a practical application of the invention I have elected to show the improved feed and righting mechanism in connection with a double filling machine, which however forms the subject of a companion application executed and filed on even dates herewith, but it is to be understood that the present invention may be used in connection with filling machines differing materially from that shown in said companion application and which is used in the present case for illustrative purposes only.

The practical application of the invention is illustrated in the accompanying drawings, wherein,—

Figure 1 shows a can-filling machine in side elevation to which the improved can feed and righting mechanism is attached. Fig. 2, shows a horizontal sectional plan view of the machine,—the section being taken on the line 2—2 of Fig. 1. Fig. 3, illustrates the can righting and feed mechanism in front elevation. Fig. 4, shows an enlarged vertical cross-section through the righting and feed device,—the section being taken on the line 4—4 of Fig. 2, and Fig. 5, illustrates another enlarged sectional detail through the same, showing a can partially elevated.

In the drawing, the numeral, 8, designates a frame shaped to form bearings and supports for the various parts of the can-filling machine and to hold an inclined hopper, 9, in an elevated position. In the present instance the hopper has a plurality of discharge tubes, 10, only one of which however is shown in the present illustration, which tubes incline downwardly and also has a plunger, 11, for each discharge tube. The plungers are connected at their upper ends by a cross-head, 12, and a rod, 13, imparts reciprocating motion to the plungers, as set forth in my said companion application.

A plunger tube, 21, intersects the lower end of each discharge tube, 10, and plunger, 22, is provided in said tube, 21, so as to cross the lower end of the discharge tube and control the outlet from the latter.

The plungers are operated by means of rods, 23, and, 27, as explained in my said pending application,—the motion being derived from a can, 35, on cam shaft, 19.

In the present illustration the lower end of each plunger tube carries an inclined overflow shell, 37, against which the cans to be filled are seated,—the cans being carried on a swinging table, 47, which sustains two cans in position to be filled and two cans to receive the overflow from those cans that are being filled.

At the rear of the swinging table the machine has a stationary table, 46, over which a reciprocating feed-plunger, 65, operates to feed the cans forward and onto the swinging table,—the feed plunger being provided with two heads, 67, to engage two cans and move them forward.

Above the plunger heads, 67, the machine has a horizontal friction plate, 70, with an up-turned yielding end, 71, to engage the top edges of the incoming cans and check their movement. The cans enter the machine by means of a guideway, 81, and are fed forward through the latter by the improved righting and feed mechanism now to be described.

The outer end of shaft, 19, carries a beveled pinion, 83, which drives a gear, 84, on the lower end of a vertical shaft, 85. The upper end of shaft, 85, extends through the bottom of a can-supporting plate, 86, which latter has an outer curved wall, 87. This wall, 87, is substantially semi-circular in form, and at one end has an inturned flange, 88, which extends upwardly from the plate, 86, as clearly shown in Fig. 2, of the drawing. On the inside, the wall, 87, has an inclined surface, 89, which increases in pitch and gradually approaches a vertical plane as the wall curves around and extends away from the flange, 88.

Around the vertical shaft, 85, and on the upper side of the can supporting plate, 86, there is provided a curved guide block, 90, which has an out-turned flange, 91, at one end that extends toward the inturned flange, 88, on the wall, 87. From the out-turned flange the guide block curves around the shaft 85, and at said flange the block has an up-standing inclined wall, 92, which gradually decreases in inclination as it extends away from the said flange. This change of inclination in the block, 90, will be noted by reference to Fig. 4 of the drawings,—the inclined wall of the block being shown very steep at the left hand of shaft, 85, in Fig. 4 and very nearly horizontal at the right hand of the shaft, 85, in the same figure.

By referring to Fig. 2, it will be noted that the inclination of the wall, 92, of the guide block is such that it gradually merges with the top surface and finally terminates in a wedge-shaped end, 93, as it leads into the guideway, 81. Directly over the confronting flanges, 88, and, 91, is a chute, 94, whose lower end terminates above the top edge or rim of wall, 87. The cans are fed into this chute from above with their cylindric sides in contact so the lowermost can will drop onto the can-supporting plate, 86, in front of the flanges, 88, and, 91, and between the outer curved wall, 87, and the base of the inclined wall, 92, of the guide block,—the open or filling-end of the can when delivered onto the plate, 86, will confront wall, 87, and the cans will therefore have a horizontal position when first deposited onto said plate.

The upper end of shaft, 85, carries a head, 95, which latter has two arms, 96, and, 97, respectively that swing through a horizontal circular path when the shaft is rotated. These arms swing over the space between the outer curved wall, 87, and the guide block, 90, and the arm, 96, has a depending can-engaging plate, 98, while arm, 97, has a depending can-engaging plate, 99. As the arms swing, the plates, 98, and, 99, engage the lowermost cylindric can in front of the flanges, 88, and, 91, and push the can forward in front. When the open or filling-end of the can reaches the beginning of the inclined wall, 89, on the inside of the curved wall, 87, said filling-end of the can will roll up the incline. While this is being done the closed end of the can will be seated against the inclined surface, 92, of the guide-block which is steepest at that point where the can will be when its filling-end begins to ride up wall, 89. As the can is then carried around by one or the other of the arms, 96, or, 97, its filling-end will be gradually elevated by the inclination of wall, 89, while its closed end or bottom will be guided in a reverse direction by the decreasing inclination of guide-block surface or wall, 92, until the can finally becomes righted, as it is delivered onto the guideway, 81.

By referring to Fig. 2 of the drawings it will be noted that arm, 97, is longer than arm, 96, by reason of the curved extension, 100, and that arm, 96, will deliver a can so its open or filling end will be partially beneath the yielding plate, 71, as shown in broken lines in said Fig. 2, and that when the arm, 97, pushes the next can around, the latter will engage the can left by arm, 96, and push it and the can ahead of it beneath the friction plate, 70, while the extension, 100, on said arm, 97, will continue the pushing and thereby locate two cans in front of the pusher heads, 67, and leave a third can partly beneath plates, 71, and, 72. Thus there will be two cans fed into place in front of the pusher-heads at each revolution of the vertical shaft, 85, and each can will have been turned from a horizontal to a vertical position while traveling around the can-supporting plate, 86. By this means the cans may be rolled to the chute, 94, and then delivered on their sides; then righted and fed into the machine irrespective of whether the cans have one end completely open or partially open.

Having thus described my invention what I claim and desire to secure by Letters Patent is:—

1. In a can-feeding and righting mechanism, the combination with a chute to feed empty cans on their sides, of a stationary table to receive and sustain the cans while on their sides; means sweeping through a circular path over the stationary table for rolling the cans over said table, and means for turning the cans on end as they are rolled over the table.

2. In a can-feeding and righting mechanism, the combination with a stationary support to receive empty cans on their sides, of rotary means movable over the support for rolling the cans over said support and means extending in a circular direction over the support for engaging an end of the rolling cans as they are rolled by the rotary means and turning the cans onto their ends.

3. In a can-feeding and righting mechanism the combination with a stationary support to receive empty cans on their sides, of rotary means movable over the stationary support for rolling the cans over the latter, and stationary inclined circular means extending in the direction of travel of the rolling cans to engage an end of the rolling cans and turn them onto their ends.

4. In a can-feeding and righting mechanism the combination with means to present empty cans on their sides, of a stationary can-support to receive the cans on their sides; rotary means traveling over the support to push and roll the cans over the support and stationary spaced apart inclined means extending in a curved direction on the stationary can support to engage the end and the circular wall of the rolling cans and turn them on one end.

5. In a can-feeding mechanism the combination with means to present empty cans on their sides, of a stationary horizontal can-support beneath the presenting means to receive the cans on their sides; stationary inclined curved means around the outer side of the stationary support; stationary inclined means on the support and spaced from the outer curved means,—both said inclined means, to engage the cans on the support and rotary means movable over the stationary support to roll the cans along the two inclined means.

6. In a can-feeding and righting mechanism the combination with a stationary support to receive empty cans on their sides, of a plurality of rotary arms movable over the stationary support to roll the cans along the support and means for turning the rolling cans on their ends as they are rolled by the arms.

7. In a can-feeding and righting mechanism the combination with means to receive empty cans on their sides, of a plurality of rotary arms movable over the receiving means to advance the cans,—one arm being short and the next arm being longer and means on the receiving means to turn the cans as they are advanced by the arms.

8. In a can-feeding and righting mechanism the combination with means to receive empty cans on their sides, of a plurality of rotary arms movable over the receiving means to advance the cans,—one arm being short and the next arm being longer; spaced-apart inclined means to engage the cans as they are advanced by the arms and means for actuating the arms.

9. In a can-feeding and righting mechanism the combination with a chute to deliver cans on their sides, of a stationary plate beneath the chute, to receive the cans on their sides; two spaced apart curved walls on the stationary plate; a vertical shaft and a plurality of horizontal arms carried on the shaft and extending over the stationary plate to engage and roll the cans while the curved walls right the cans.

In testimony whereof I affix my signature in presence of two witnesses.

CHARLES H. AYARS.

Witnesses:
O. W. ACTON,
MARY D. BANKS.